(12) United States Patent
Nakamura et al.

(10) Patent No.: US 7,681,837 B2
(45) Date of Patent: Mar. 23, 2010

(54) METHOD AND APPARATUS FOR CLOSING A SWING TAIL ON AN AIRCRAFT

(75) Inventors: Darryl Hitoshi Nakamura, Sammamish, WA (US); Kurt Poechlauer, Everett, WA (US); Craig Alan Vyeson, Everett, WA (US); Roger Probert-Baker, Bellevue, WA (US); Quentin Theodor Pietersen, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 37 days.

(21) Appl. No.: 11/840,677

(22) Filed: Aug. 17, 2007

(65) Prior Publication Data

US 2009/0045288 A1 Feb. 19, 2009

(51) Int. Cl.
*B64C 1/14* (2006.01)
(52) U.S. Cl. .................. 244/129.4; 244/137.1; 244/119; 244/131
(58) Field of Classification Search .............. 244/129.4, 244/137.1, 119, 131
See application file for complete search history.

(56) References Cited

U.S. PATENT DOCUMENTS 2,977,077 A * 3/1961 Pearson .................... 244/118.1
3,043,410 A    7/1962 Pearson
3,653,615 A    4/1972 Spence
5,820,077 A *  10/1998 Sutliff et al. ................ 244/119
7,503,523 B2 * 3/2009 Perez-Sanchez ......... 244/129.4

FOREIGN PATENT DOCUMENTS

EP    0743240 A    11/1996
GB     737163 A     9/1955

OTHER PUBLICATIONS

U.S. Appl. No. 11/589,623, filed Oct. 30, 2006, DiEsposti et al.
U.S. Appl. No. 11/541,849, filed Oct. 2, 2006, Plude et al.
PCT Search and Written Opinion for PCT/US2008/072933 dated Sep. 30, 2009.

* cited by examiner

*Primary Examiner*—J. Woodrow Eldred
(74) *Attorney, Agent, or Firm*—Yee & Associates, P.C.; Brett L. Halperin

(57) ABSTRACT

A method and apparatus for aligning a swing tail cargo door. An alignment system comprises an alignment ramp, a set of pull-in hook mechanisms, and a set of lock trains. The alignment ramp may be configured for initial alignment between a swing tail cargo door and an aircraft fuselage during closing of the swing tail cargo door. The set of pull-in hook mechanisms may be disposed along an interface between the swing tail cargo door and the aircraft fuselage and may be capable of a final alignment between the swing tail cargo door and the aircraft fuselage during the closing of the swing tail cargo door. The set of lock trains may be disposed along the interface and may be capable of locking a plurality of latch actuators in the latched position.

20 Claims, 19 Drawing Sheets

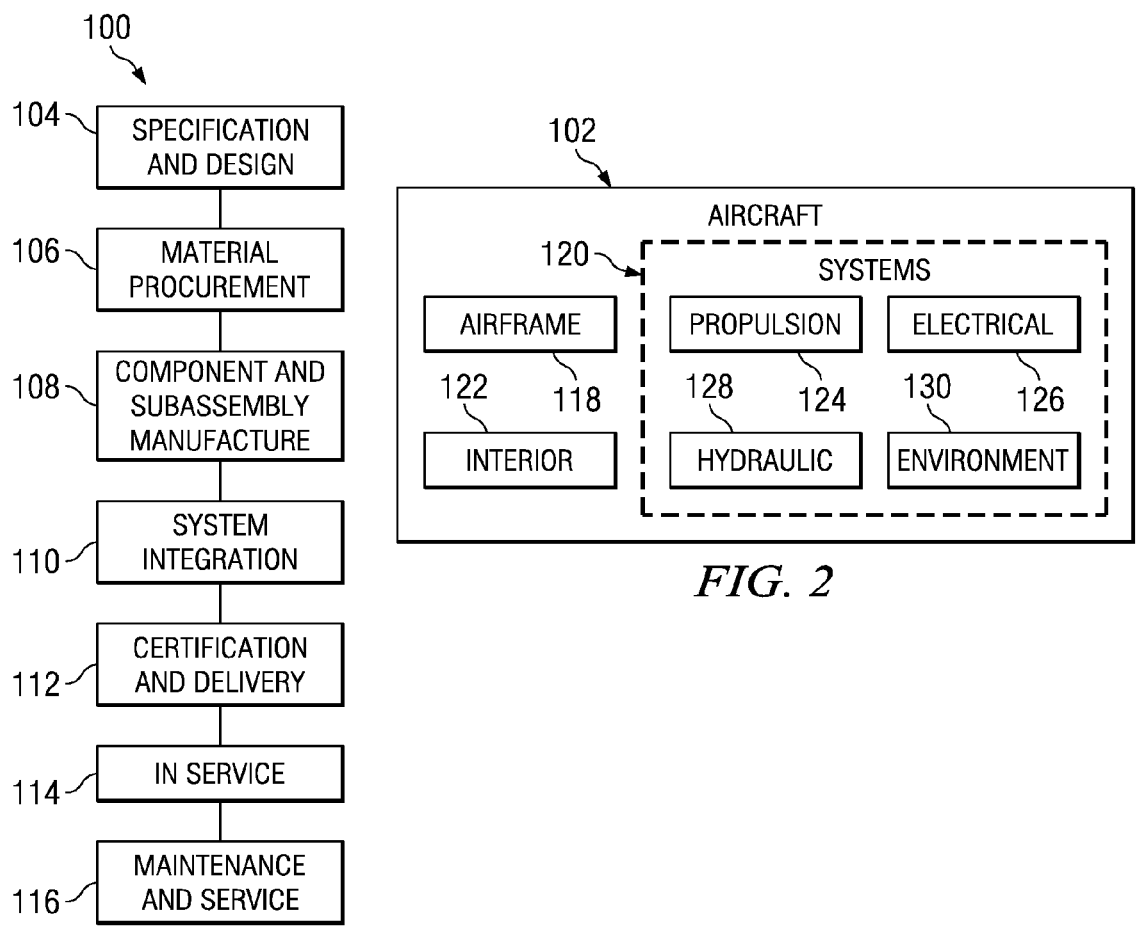
FIG. 1
FIG. 2
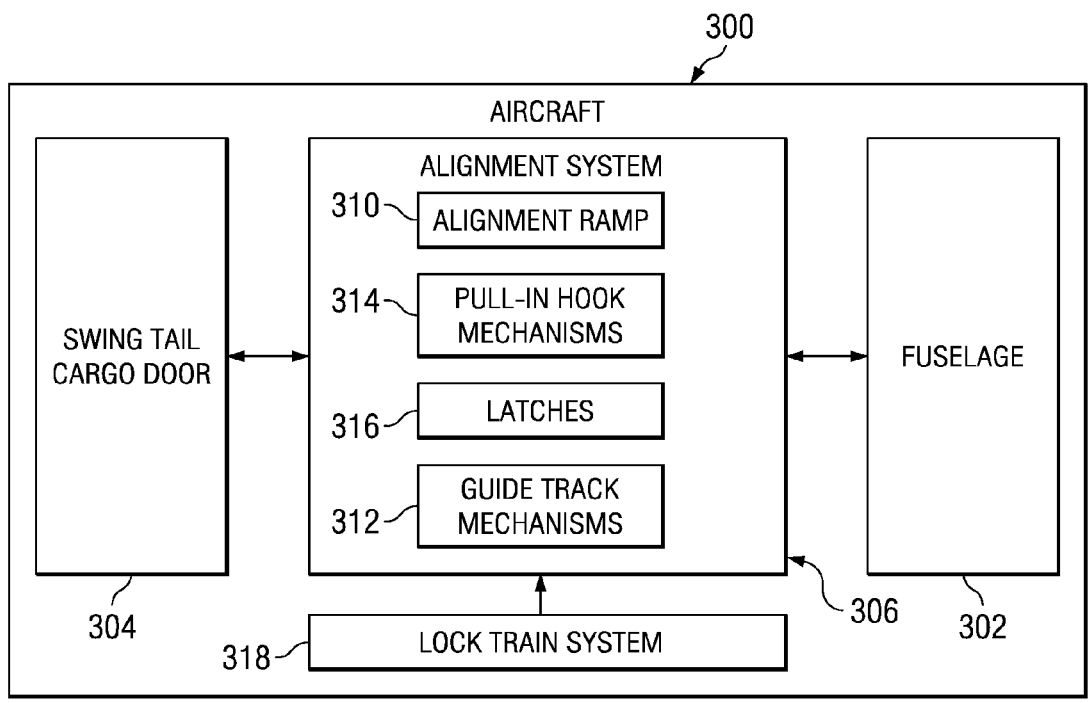
FIG. 3

METHOD AND APPARATUS FOR CLOSING A SWING TAIL ON AN AIRCRAFT

BACKGROUND INFORMATION

1. Field

The present disclosure relates generally to an improved aircraft and in particular to a swing tail cargo door on an aircraft. Still more particularly, the present disclosure relates to a method and apparatus for moving a swing tail cargo door on an aircraft.

2. Background

A swing tail aircraft may be an aircraft in which the tail portion of the aircraft may be moveably mounted to allow the tail portion to swing or move to expose the inner portion of the aircraft. This tail may also be referred to as a swing tail cargo door.

With the use of the swing tail cargo door, larger cargo, such as, without limitation, vehicles, fuselage sections, or wings, may be placed into and moved out of an aircraft. This type of cargo may be loaded and unloaded from the back of the aircraft with the swing tail in an open position. In this manner, much larger parts may be placed into the aircraft in comparison to more traditional cargo doors.

With large cargo aircraft, the weight of the swing tail door may cause alignment problems when closing the swing tail cargo door. For example, the swing tail door may become out of line vertically with respect to the fuselage. If the alignment varies too much, latching and locking mechanisms may be unable to properly close, latch, and lock the swing tail door in place.

Currently, this kind of misalignment may require aircraft personnel to use equipment to lift the swing tail cargo door upwards to restore the vertical alignment to properly close the swing tail door. Such a process may be manually intensive requiring equipment and personnel to restore the alignment when closing the swing tail door. This type of system, however, may not allow for a quick closure especially in high wind conditions.

Accordingly, there is a need for a method and apparatus for aligning a swing tail cargo door, which overcomes the problems discussed above.

SUMMARY

The different advantageous embodiments provide a method and apparatus for aligning a swing tail cargo door in a swing tail aircraft. An example of a swing tail aircraft may be a 747-400 large cargo freighter, from The Boeing Company. The tail portion of this aircraft may be moveable on one side at the aft section of the fuselage with a hinge system. An alignment system comprises an alignment ramp, a set of pull-in hook mechanisms, and a set of lock trains. The alignment ramp may be configured for initial alignment between a swing tail cargo door and an aircraft fuselage during closing of the swing tail cargo door. The set of pull-in hook mechanisms may be disposed along an interface between the swing tail cargo door and the aircraft fuselage and may be capable of a final alignment between the swing tail cargo door and the aircraft fuselage during the closing of the swing tail cargo door. The set of lock trains may be disposed along the interface and may be capable of locking a plurality of latch actuators.

In another advantageous embodiment, an aircraft comprises a fuselage, a pair of wings attached to the fuselage, a swing tail cargo door, and an alignment system. The swing tail cargo door may be moveably attached to the fuselage. The alignment system may be capable of progressively aligning the swing tail cargo door as the swing tail cargo door moves into a closed position.

In yet another advantageous embodiment, a method is provided for closing a swing tail cargo door. The swing tail cargo door may be moved towards a closed position. The swing tail cargo door may be progressively aligned relative to an aircraft fuselage with a plurality of alignment systems while the swing tail cargo door moves towards the closed position.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The embodiments of the disclosure itself, however, as well as a preferred mode of use, further objectives and advantages thereof, will best be understood by reference to the following detailed description of an advantageous embodiment of the present disclosure when read in conjunction with the accompanying drawings, wherein:

FIG. 1 is a flow diagram of aircraft production and service methodology in accordance with an advantageous embodiment;

FIG. 2 is a block diagram of an aircraft in accordance with an advantageous embodiment;

FIG. 3 is an illustration of a functional block diagram of an alignment and locking system for a swing tail aircraft in accordance with an advantageous embodiment;

DETAILED DESCRIPTION

Figure 4:
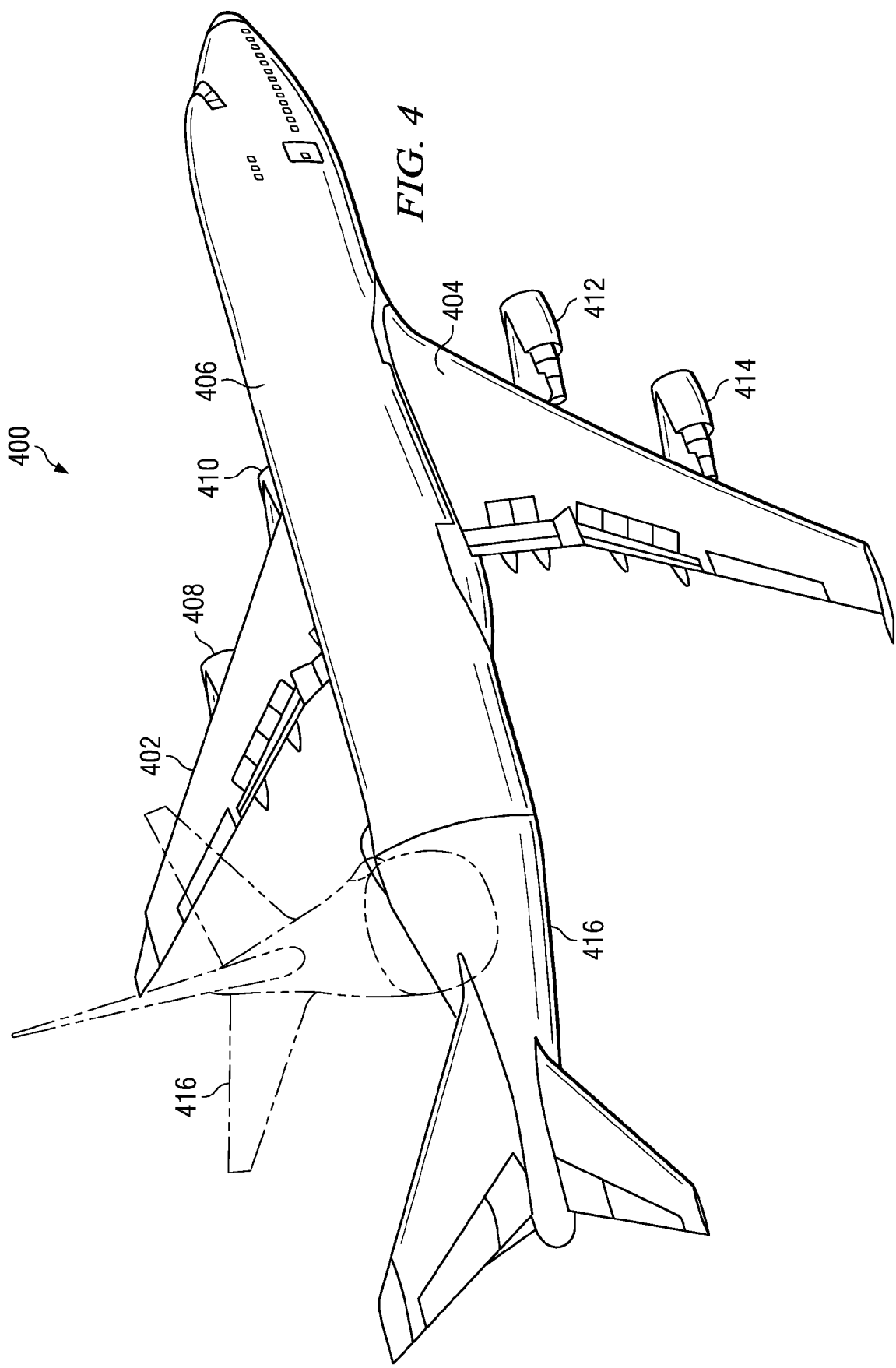
FIG. 4 is an illustration of an aircraft with a swing tail cargo door in accordance with an advantageous embodiment.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

With reference now to FIG. 3, an illustration of a functional block diagram of an alignment and locking system for a swing tail aircraft is depicted in accordance with an advantageous embodiment. In this example, aircraft 300 may include fuselage 302 and swing tail cargo door 304. Alignment system 306 may be used to align swing tail cargo door 304 relative to fuselage 302 progressively while swing tail cargo door 304 moves towards a closed position. In these examples, the progressive or increased granularity in alignment may be provided through alignment features, such as, without limitation, alignment ramp 310, pull-in hook mechanisms 314, and latches 316.

Alignment ramp 310 may be configured for initial alignment between swing tail cargo door 304 and fuselage 302 during closing of swing tail cargo door 304. Guide track mechanisms 312 may be disposed along an interface between swing tail cargo door 304 and fuselage 302. Guide track mechanisms 312 may be capable of intermediate alignment between swing tail cargo door 304 and fuselage 302 during closing of swing tail cargo door 304. Additionally, pull-in hook mechanisms 314 may be disposed along an interface between swing tail cargo door 304 and fuselage 302. Pull-in hook mechanisms 314 may be capable of a final alignment between swing tail cargo door 304 and fuselage 302.

Latches 316 may be disposed along the interface between swing tail cargo door 304 and fuselage 302. These latches may be capable of latching or holding swing tail cargo door 304 in place with fuselage 302 in a closed position.

Lock train system 318 also may be disposed along the interface between swing tail cargo door 304 and fuselage 302. Lock train system 318 may be a set of lock trains capable of locking latches 316 in place. Latches 316, in these examples, may include latch actuators and latch lugs. A latch actuator may engage or move to a closed position with respect to a latch lug with swing tail cargo door 304 in a closed position with respect to fuselage 302. Although three levels or granulaties of alignment are shown in alignment system 306, other numbers of alignment levels or features may be provided depending on the particular implementation.

With reference now to FIG. 4, an illustration of an aircraft with a swing tail cargo door is depicted in accordance with an advantageous embodiment. In this example, aircraft 400 may have wings 402 and 404 attached to fuselage 406. Aircraft 400 also may include wing mounted engines 408, 410, 412, and 414.

Aircraft 400 also may have swing tail cargo door 416, shown in both a closed position and an open position. The open position is shown in phantom in this example. Swing tail cargo door 416 may move horizontally relative to the fuselage to change positions. Aircraft 400 may be considered to be in an operation configuration in the closed position, allowing aircraft 400 to fly. In these examples, aircraft 400 may be implemented as a 747-400LCF for transporting different components, such as a fuselage and wings of an aircraft being manufactured.

The different advantageous embodiments provide an apparatus and method to restore a tail section of an aircraft to an operational configuration. In one advantageous embodiment, an aircraft comprises a fuselage, a pair of wings attached to the fuselage, a swing tail cargo door, and an alignment system. The swing tail cargo door may be moveably attached to the fuselage. The alignment system may be capable of progressively aligning the swing tail cargo door as the swing tail cargo door moves into a closed position. The swing tail cargo door may be moved towards a closed position. The swing tail cargo door may be progressively aligned relative to an aircraft fuselage with a plurality of alignment systems while the swing tail cargo door moves towards the closed position.

Figure 5:
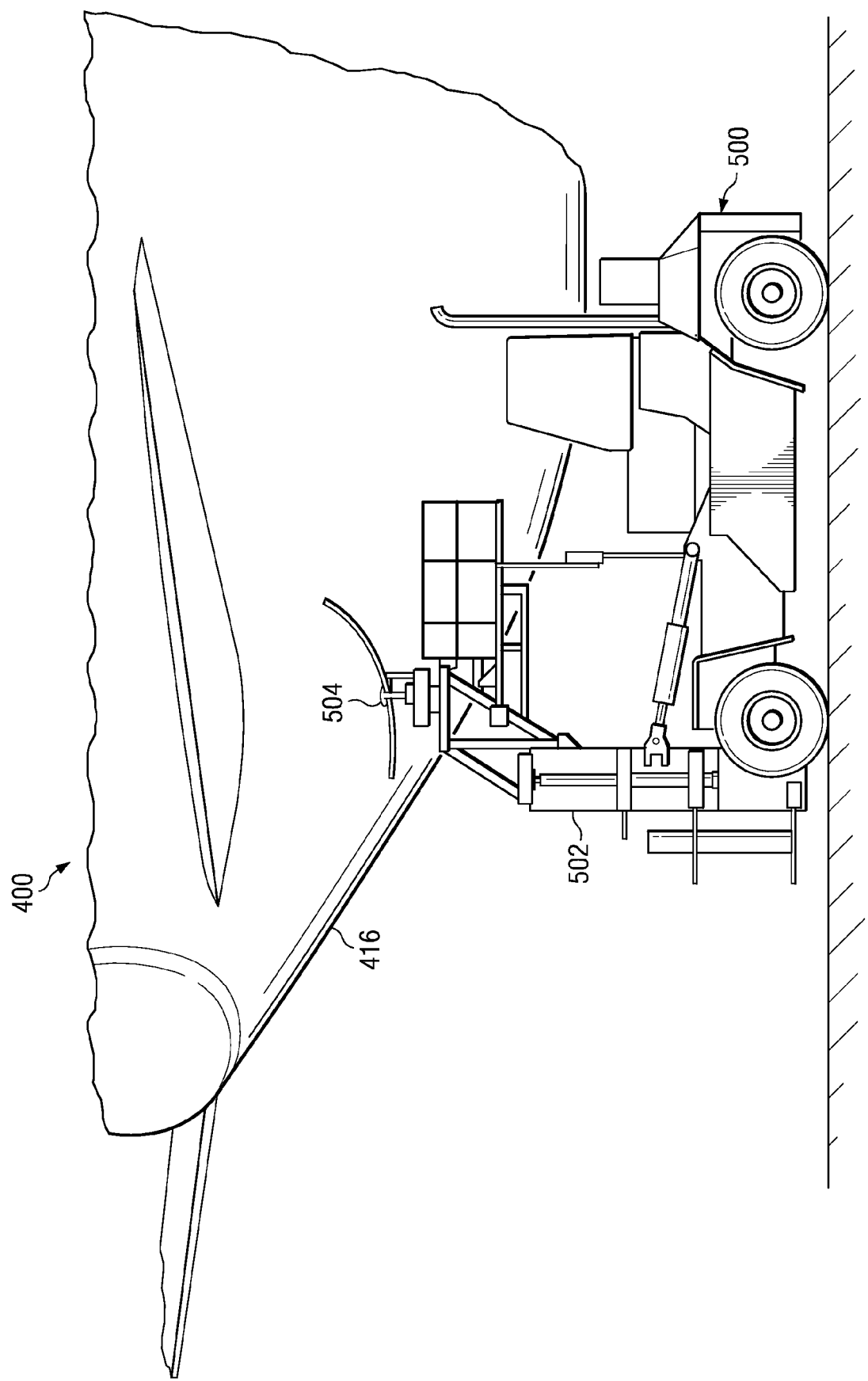
FIG. 5 is an illustration of an aircraft with mobile tail support in accordance with an advantageous embodiment.

With reference now to FIG. 5, an illustration of an aircraft with mobile tail support is depicted in accordance with an advantageous embodiment. In this example, swing tail cargo door 416 is depicted in a closed position on aircraft 400. Swing tail cargo door 416 may be opened and closed with assistance from mobile tail support 500. Mobile tail support 500 may be a vehicle having tool 502, which may be used. Mobile tail support 500 may provide vertical support to swing tail cargo door 416 as swing tail cargo door 416 rotates from either an open to closed position or a closed to open position. Tool 502 may move vertically to engage swing tail cargo door 416 at socket 504 in aircraft 400 to open and close swing tail cargo door 416. With tool 502 engaged in socket 504, mobile tail support 500 may move swing tail cargo door 416 in an arc or path to open and close swing tail cargo door 416. Mobile tail support 500 may provide the force needed to engage the different alignment features when closing swing tail cargo door 416.

Figure 6:
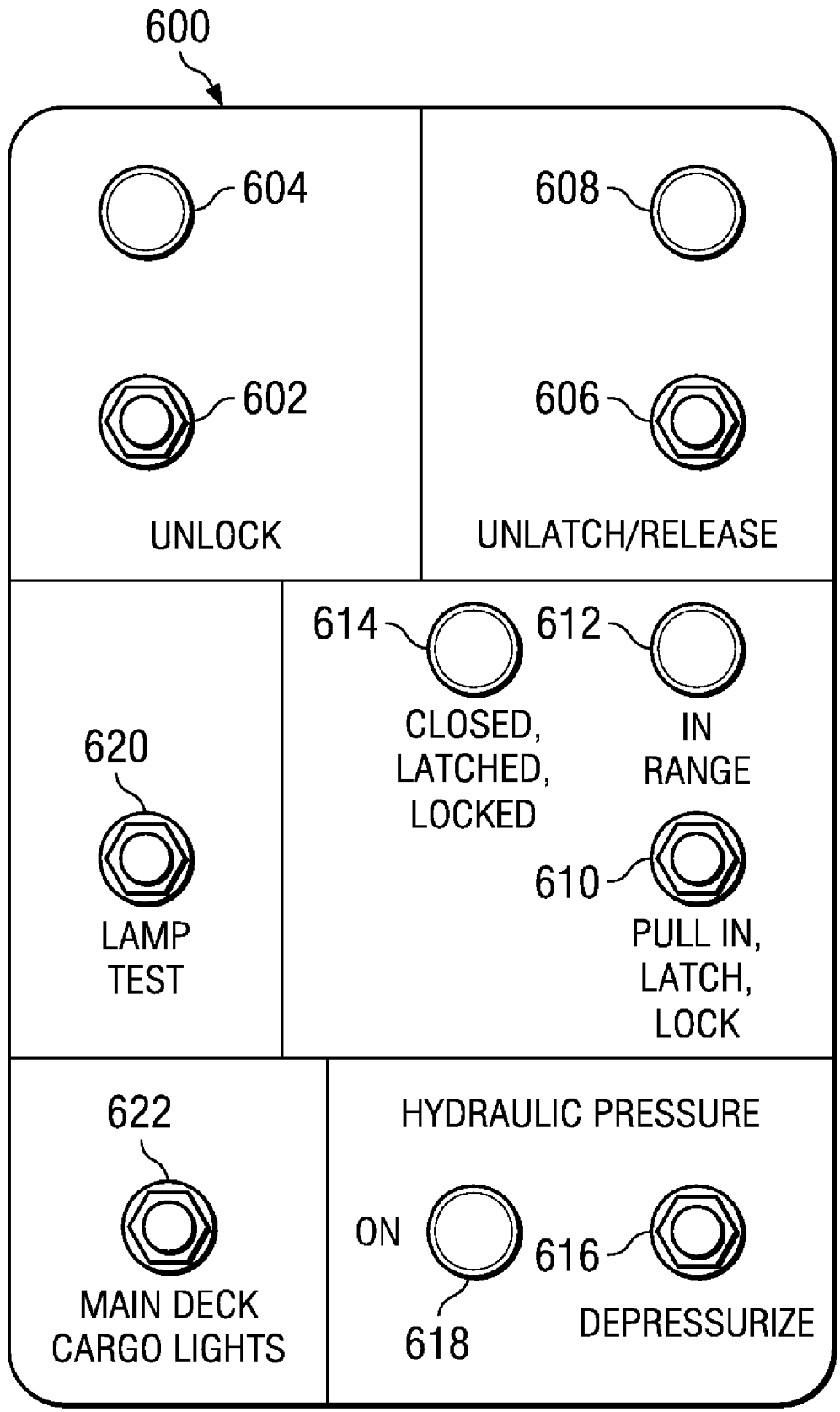
FIG. 6 is an illustration of a latch/lock system control panel in accordance with an advantageous embodiment.

Turning now to FIG. 6, an illustration of a latch/lock system control panel is depicted in accordance with an advantageous embodiment. In this example, panel 600 may be found in or on aircraft 400 in FIG. 4 and may be used to control operations to latch and unlatch and lock and unlock a swing tail cargo door.

Switch 602 in panel 600 may be used to unlock the swing tail cargo door. Indicator 604 may be used to indicate when swing tail cargo door 416 has been unlocked. Switch 606 may be used to unlatch or release the swing tail cargo door once it has been unlocked. Indicator 608 may be used to indicate when swing tail cargo door 416 has been unlatched.

Further, switch 610 may be used to pull-in, latch, and lock swing tail cargo door 416. Indicator 612 may be used to indicate when swing tail cargo door 416 is close enough or in range to be pulled in. Indicator 614 may indicate when swing tail cargo door 416 has actually been closed, latched, and locked.

Switch 616 may be used to depressurize the hydraulics after swing tail cargo door 416 has been pulled into a closed position. This depressurization of the hydraulics is for the hydraulic system that may be used to pull-in, latch, and lock swing tail cargo door 416. Indicator 618 may indicate when the hydraulic system has been depressurized. Switch 620 may be used to test the indicators in panel 600 to determine whether these indicators are functioning properly. Switch 622 may be used to turn the lights in the cargo area on and off.

Figure 7:
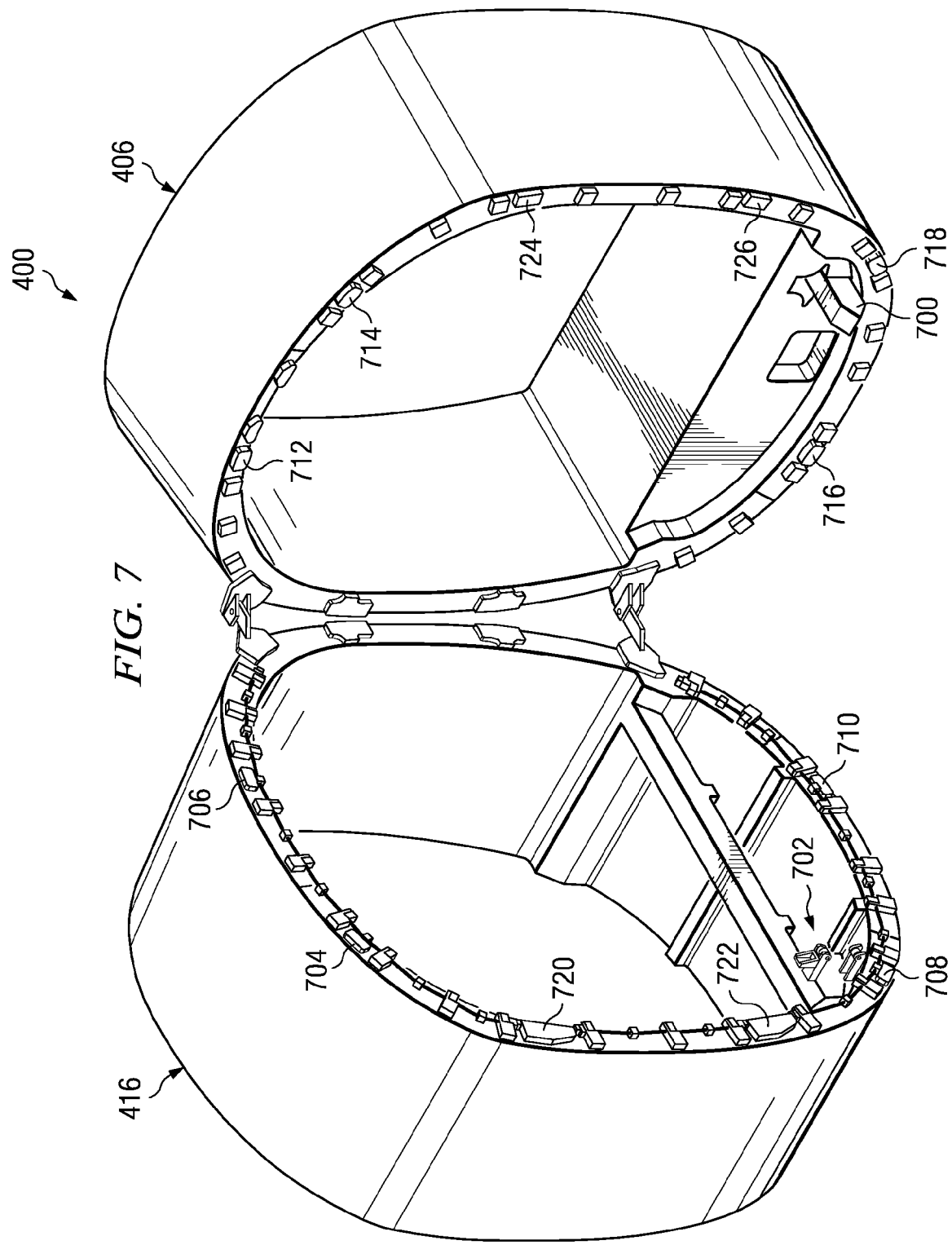
FIG. 7 is an illustration of alignment features in a swing tail cargo door in accordance with an advantageous embodiment.

Turning next to FIG. 7, an illustration of alignment features in a swing tail cargo door is depicted in accordance with an advantageous embodiment. In this example, a portion of swing tail cargo door 416 and fuselage 406 in aircraft 400 may include alignment features that may be used to perform alignment during closing of swing tail cargo door 416. In the different advantageous embodiments, an alignment system with multiple levels of alignments may be provided to close swing tail cargo door 416. In the illustrative examples, three levels of alignment may be used, such as an initial alignment, an intermediate alignment, and a fine alignment.

In these examples, an initial or gross alignment feature may be provided through alignment ramp 700 in guide roller system 702. A second or intermediate alignment feature may be provided through centering guides 704, 706, 708, and 710 in conjunction with centering rollers 712, 714, 716, and 718. A third or fine alignment feature for closing swing tail cargo door 416 may be provided through pull-in hook 720 and 722 in conjunction with receiver fitting 724 and 726. These alignment features in the alignment system may be progressive alignments. Each successive alignment feature provides a finer alignment than the previous alignment feature, in these examples.

Although three levels or types of alignment are shown in these different examples, other numbers of levels or types of alignment may be used, depending on the particular implementation. For example, other advantageous embodiments may use two levels or four levels of alignment in closing swing tail cargo door 416.

Figure 8:
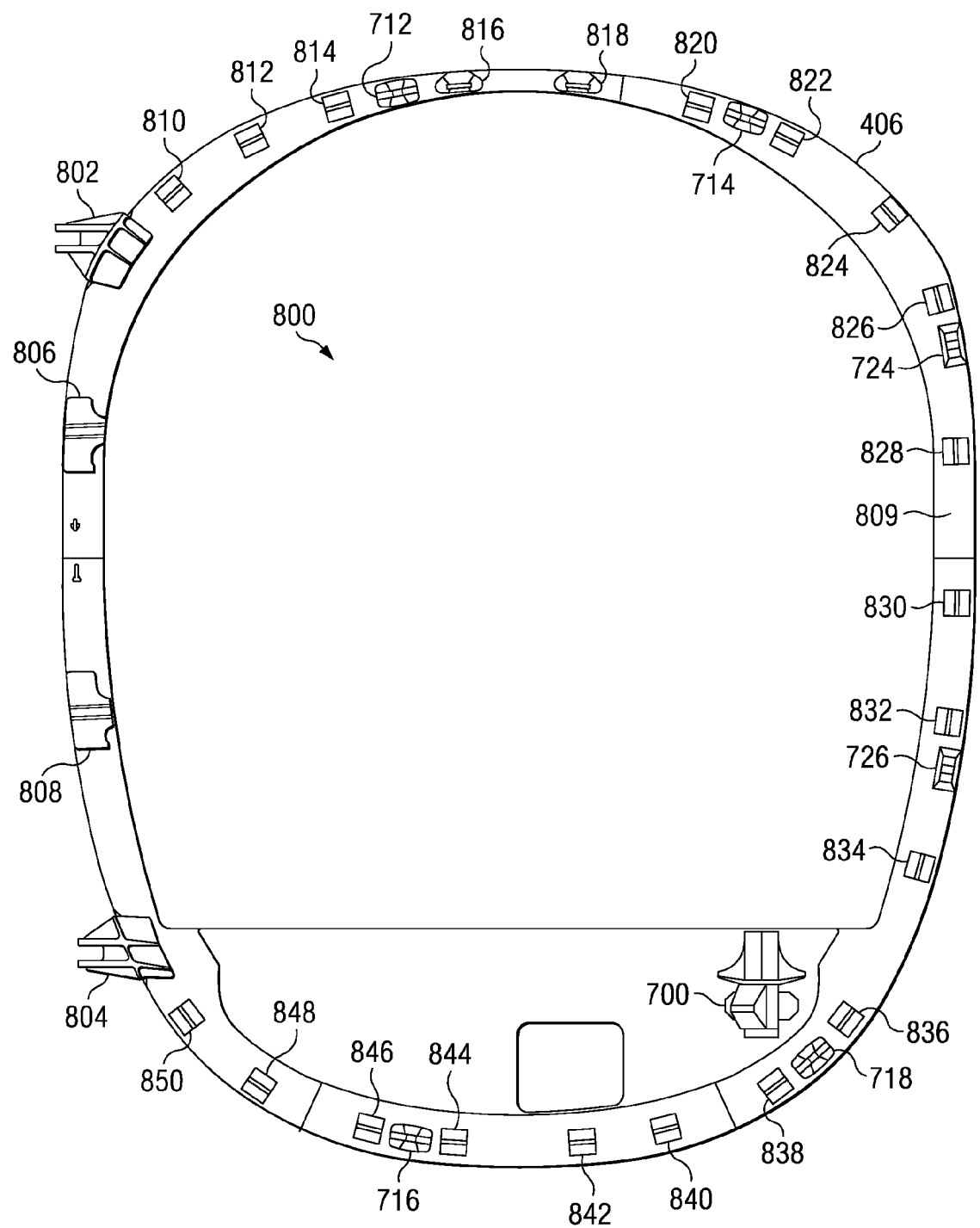
FIG. 8 is an illustration of a view into a fuselage of an aircraft in accordance with an advantageous embodiment.

Turning now to FIG. 8, an illustration of a view into a fuselage of an aircraft is depicted in accordance with an advantageous embodiment. In this example, a forward looking view into fuselage 406 may include cargo area 800. Upper main hinge 802, lower main hinge 804, upper intermediate hinge 806, and lower intermediate hinge 808 may be located on surface 809 of fuselage 406 and may be part of a hinge system for moveably attaching swing tail cargo door 416 to fuselage 406.

In this depicted example, latch lugs 810, 812, 814, 816, 818, 820, 822, 824, 826, 828, 830, 832, 834, 836, 838, 840, 842, 844, 846, 848, and 850 may form part of a latching system that may hold and/or lock swing tail cargo door 416 in a closed position with respect to fuselage 406.

Figure 9:
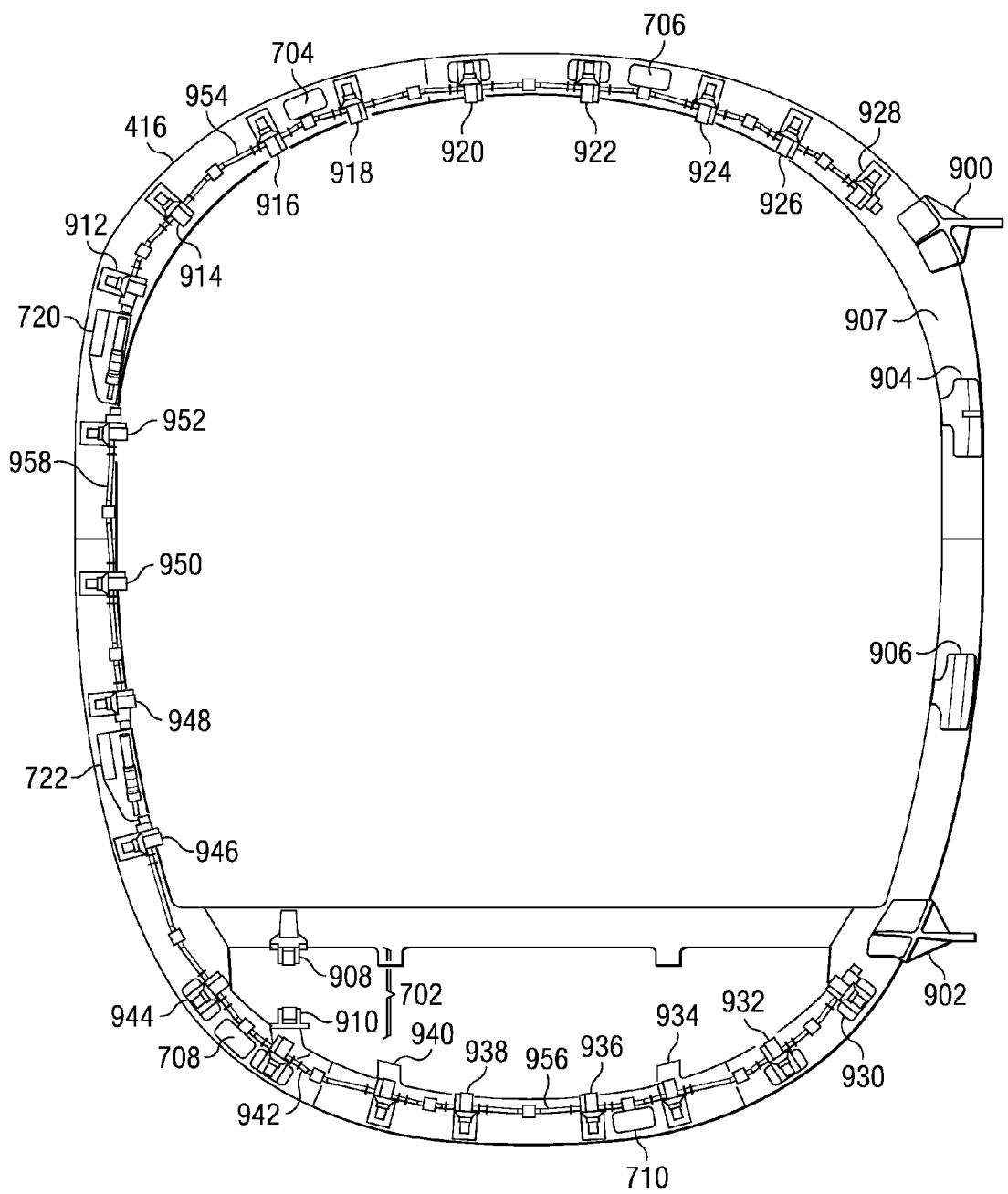
FIG. 9 is an illustration of a view into a swing tail cargo door in accordance with an advantageous embodiment.

Turning now to FIG. 9, an illustration of a view into a swing tail cargo door is depicted in accordance with an advantageous embodiment. In this example, swing tail cargo door 416 may have upper main hinge 900, lower main hinge 902, upper intermediate hinge 904 and lower intermediate hinge 906 located on surface 907. These hinges may be part of a hinge system to moveably attach swing tail cargo door 416 to fuselage 406. These hinges may be connected to upper main hinge 802, lower main hinge 804, upper intermediate hinge 806 and lower intermediate hinge 808, respectively in FIG. 8, to form the hinge system in these examples. Guide roller system 702 may include upper ramp roller 908 and lower ramp roller 910.

Latch actuators 912, 914, 916, 918, 920, 922, 924, 926, 928, 930, 932, 934, 936, 938, 940, 942, 944, 946, 948, 950 and 952 may be located on surface 907 of swing tail door 416. These latch actuators may be moved to engage latch lugs 810, 812, 814, 816, 818, 820, 822, 824, 826, 828, 830, 832, 834, 836, 838, 840, 842, 844, and 846 on surface 809 of fuselage 406 to hold and/or lock swing tail cargo door 416 in a closed position.

In this example, latch actuators 912, 914, 916, 918, 920, 922, 924, 926, and 928 may be connected and controlled by upper lock train 954. In a similar fashion, lower lock train 956 may connect and control latch actuators 930, 932, 934, 936, 938, 940, 942, 944, and 946. Mid lock train 958 may connect and control latch actuators 948, 950 and 952 in these examples.

Figure 10:
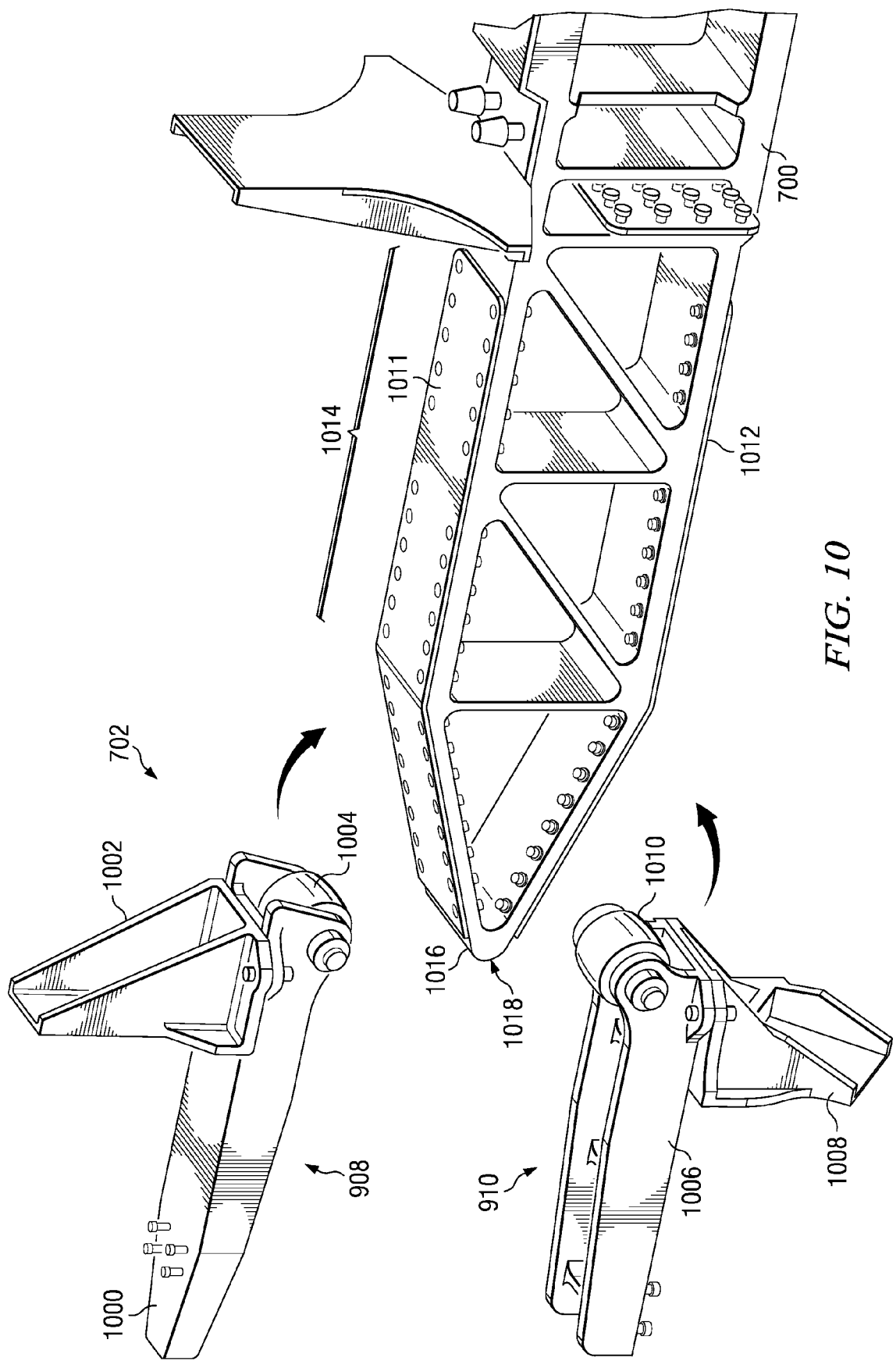
FIG. 10 is an illustration of an initial alignment feature is depicted in accordance with an advantageous embodiment.

With reference now to FIG. 10, an illustration of an initial alignment feature is depicted in accordance with an advantageous embodiment. In this example, alignment ramp 700 and guide roller system 702 are shown in a position in which swing tail cargo door 416 may be around twelve degrees from being closed.

Upper ramp roller 908 may include upper ramp roller assembly 1000 and member 1002. Member 1002 may be attached to upper ramp roller assembly 1000 with both of these members being attached to swing tail cargo door 416. Additionally, upper ramp roller assembly 1000 may have roller 1004. Lower ramp roller 910 may have lower ramp roller assembly 1006 and member 1008, which are attached to each other. Both of these components are attached to swing tail cargo door 416. Further, lower ramp roller assembly 1006 may have roller 1010.

Roller 1004 and roller 1010 may be positioned such that they may receive and engage surface 1011 and surface 1012 of alignment ramp 700. These surfaces may be substantially parallel to each other around section 1014. Surface 1011 and surface 1012 may slope to converge at point 1016 forming a triangular section 1018 for alignment ramp 700.

As swing tail cargo door 416 closes, roller 1004 may contact or engage surface 1011 in triangular section 1018 if swing tail cargo door 416 is vertically out of line for proper closing. After roller 1004 has engaged surface 1011 in triangular section 1018, further closing movement of swing tail cargo door 416 may cause swing tail cargo door 416 to move upwards to perform a gross or initial alignment of swing tail cargo door 416 with respect to fuselage 406 in FIG. 4.

Figure 11:
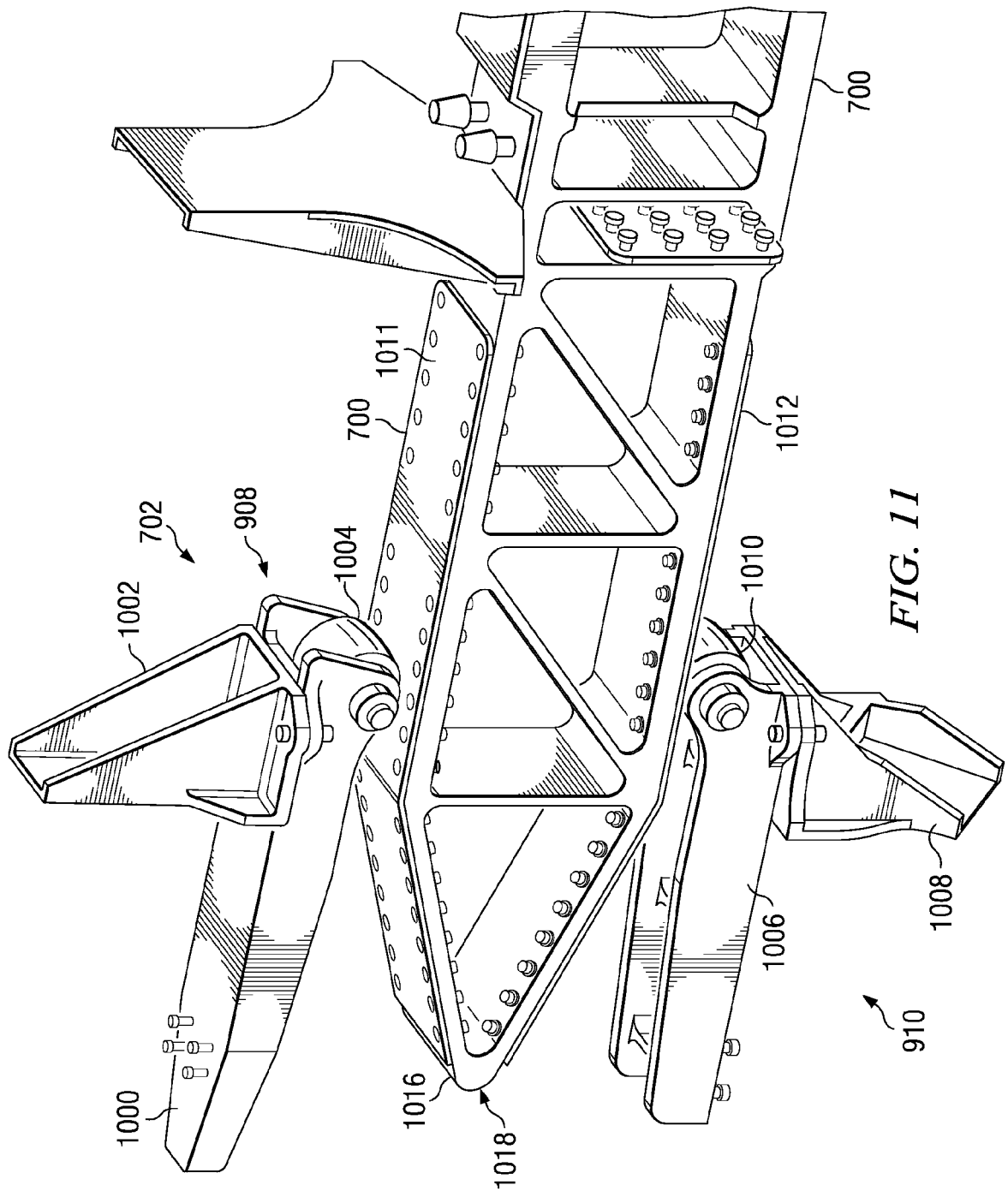
FIG. 11 is an illustration of an initial alignment feature in a partially engaged position in accordance with an advantageous embodiment.

Turning now to FIG. 11, an illustration of an initial alignment feature in a partially engaged position is depicted in accordance with an advantageous embodiment. In this example, swing tail cargo door 416 is around six degrees from a closed position with respect to fuselage 406. As depicted, rollers 1004 and 1010 have engaged surfaces 1011 and 1012 and may have moved swing tail cargo door upwards or downwards in a vertical position to provide an initial alignment of swing tail cargo door 416 with respect to fuselage 406.

Figure 12:
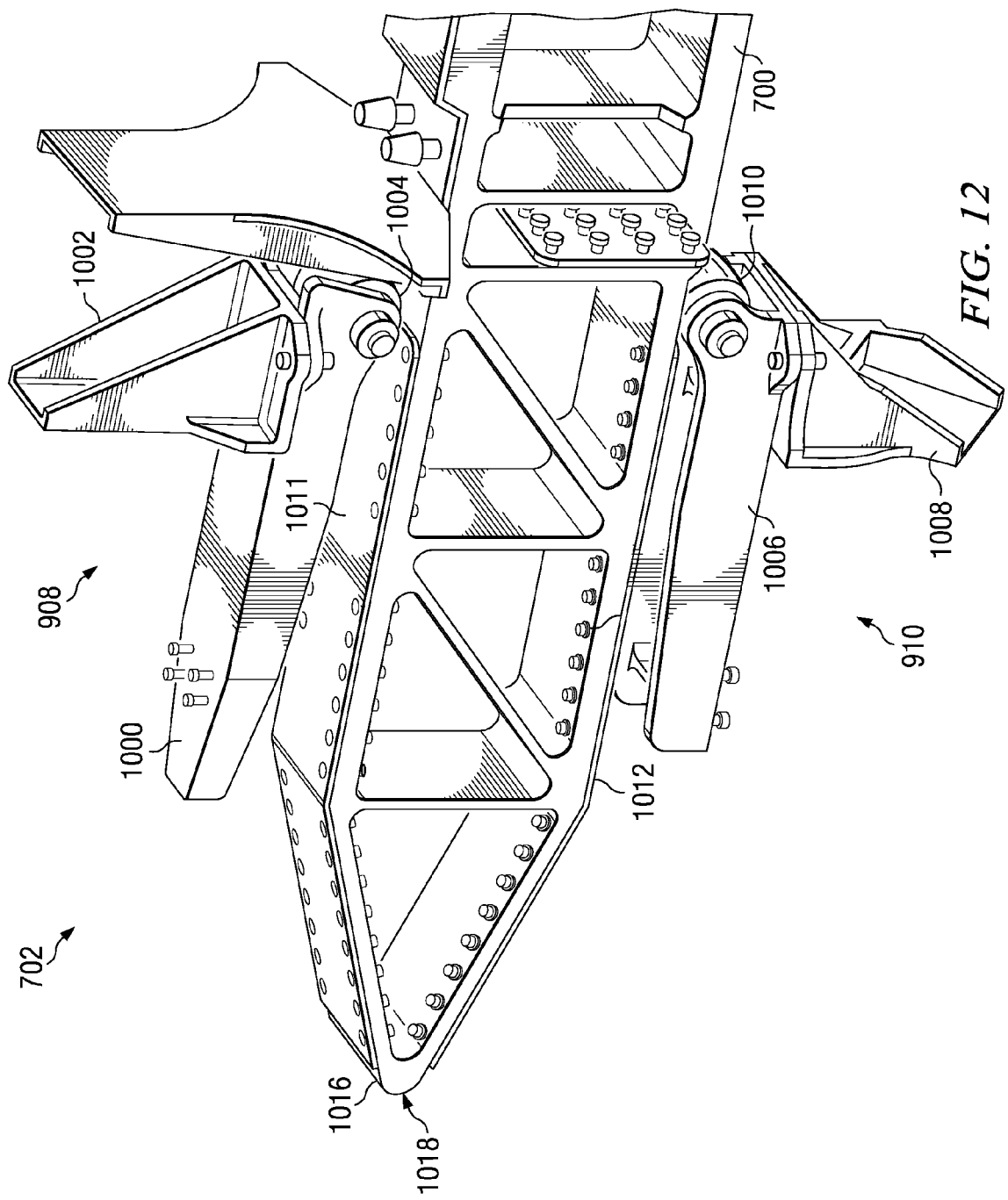
FIG. 12 is an illustration of an initial alignment feature in a fully engaged position in accordance with an advantageous embodiment.

Turning now to FIG. 12, an illustration of an initial alignment feature in a fully engaged position is depicted in accordance with an advantageous embodiment. In this example, alignment ramp 700 and upper ramp roller 908 and lower ramp roller 910 are shown with respect to each other with swing tail cargo door 416 in a closed position.

In addition to aligning the swing tail cargo door 416 with fuselage 406 when swing tail cargo door 416 is lower than fuselage 406, alignment ramp 700 and guide roller system 702 also may be used for aligning swing tail cargo door 416 with fuselage 406 when swing tail cargo door 416 is higher than fuselage 406. The initial alignment system may push swing tail cargo door 416 down through contact between roller 1010 and surface 1012.

Figure 13:
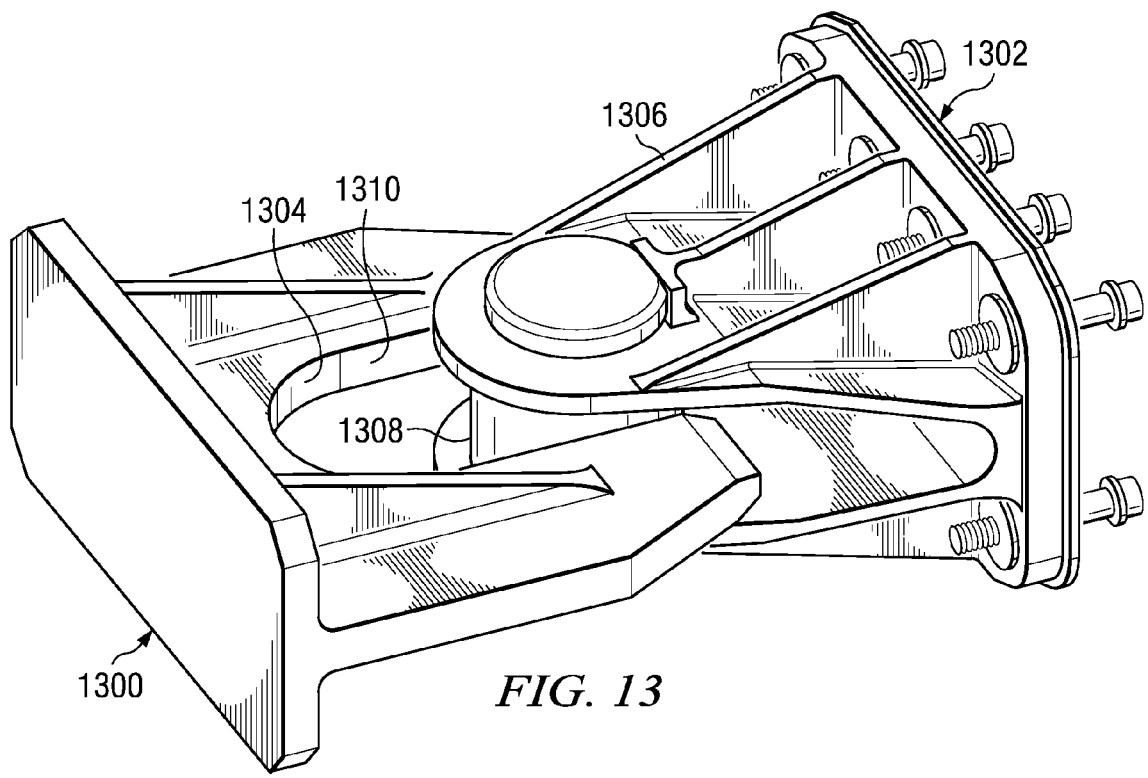
FIG. 13 is an illustration of a centering guide and a centering roller in an intermediate alignment position in accordance with an advantageous embodiment.

Turning now to FIG. 13, an illustration of a centering guide and a centering roller in an intermediate alignment position is depicted in accordance with an advantageous embodiment. In this example, centering guide 1300 may be an example of a centering guide, such as centering guides 704, 706, 708 or 710 in FIG. 7. Centering roller 1302 may be an example of a centering roller, such as centering rollers 712, 714, 716 or 718 in FIG. 7. These components may form centering guide systems for intermediate alignment. In this example, the position of centering guide 1300 is relative to centering roller 1302 when swing tail cargo door 416 is around 2.5 degrees from being closed.

Centering guide 1300 may be mounted on surface 907 on swing tail cargo door 416, while centering roller 1302 may be mounted on surface 809 on fuselage 406. Centering guide 1300 may include guide track 1304. Centering roller 1302 includes guide roller assembly 1306 and roller 1308.

As swing tail cargo door 416 closes, roller 1308 may move into guide track 1304 in centering guide 1300 and may further align swing tail cargo door 416. More specifically, surface 1310 in guide track 1304 may engage roller 1308 and may cause swing tail cargo door 416 to further align with fuselage 406. In this manner, the centering guides and centering rollers may provide for additional finer alignment of swing tail cargo door 416 after initial alignment occurs when guide roller system 702 engages alignment ramp 700.

Figure 14:
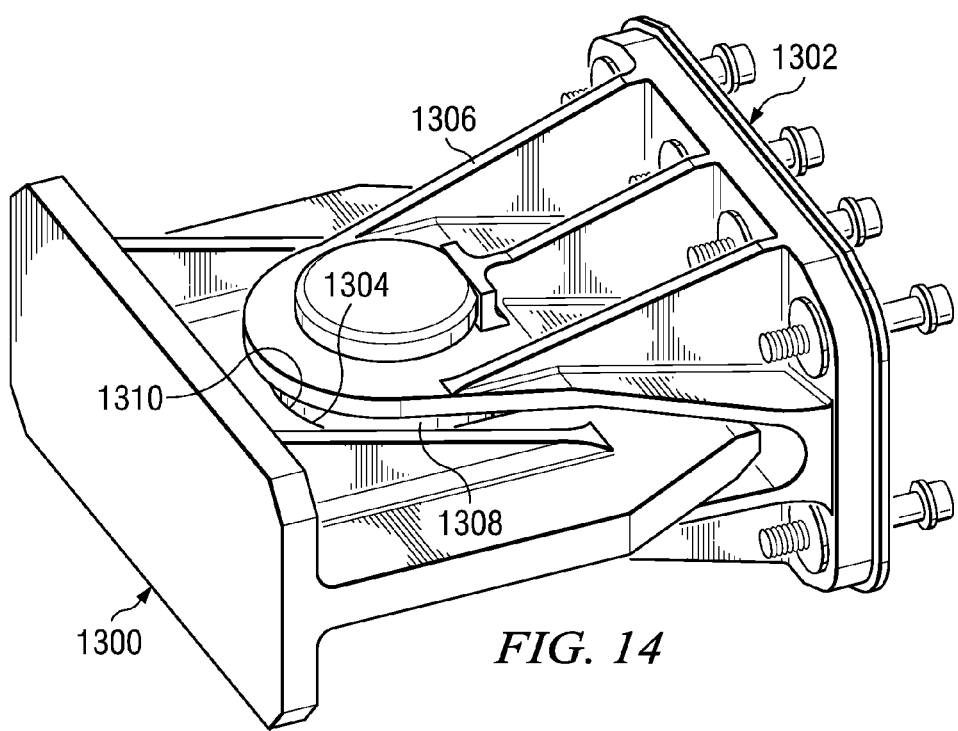
FIG. 14 is an illustration of a center guide and a centering guide roller in a closed position in accordance with an advantageous embodiment.

Turning now to FIG. 14, an illustration of a center guide and a centering guide roller in a closed position is depicted in accordance with an advantageous embodiment. As a result, the centering guides and rollers may provide alignment in a clockwise (or tangential) direction. Therefore, a horizontal as well as a vertical component may be present to the direction of alignment within this feature.

This intermediate alignment of swing tail cargo door 416 may be accomplished using other components other than centering guides and centering rollers. For example, tapered or conical pins or splines may be used with mating tapered or conical receptacles or splines. In this example, the configuration of centering guide 1300 and centering roller 1302 are shown with swing tail cargo door 416 around a closed position.

Roller 1308 in guide roller assembly 1306 may now be engaged within track 1304 in centering guide 1300. This engagement may push or move swing tail cargo door 416 horizontally and/or vertically to provide for an intermediate level of alignment.

Figure 15:
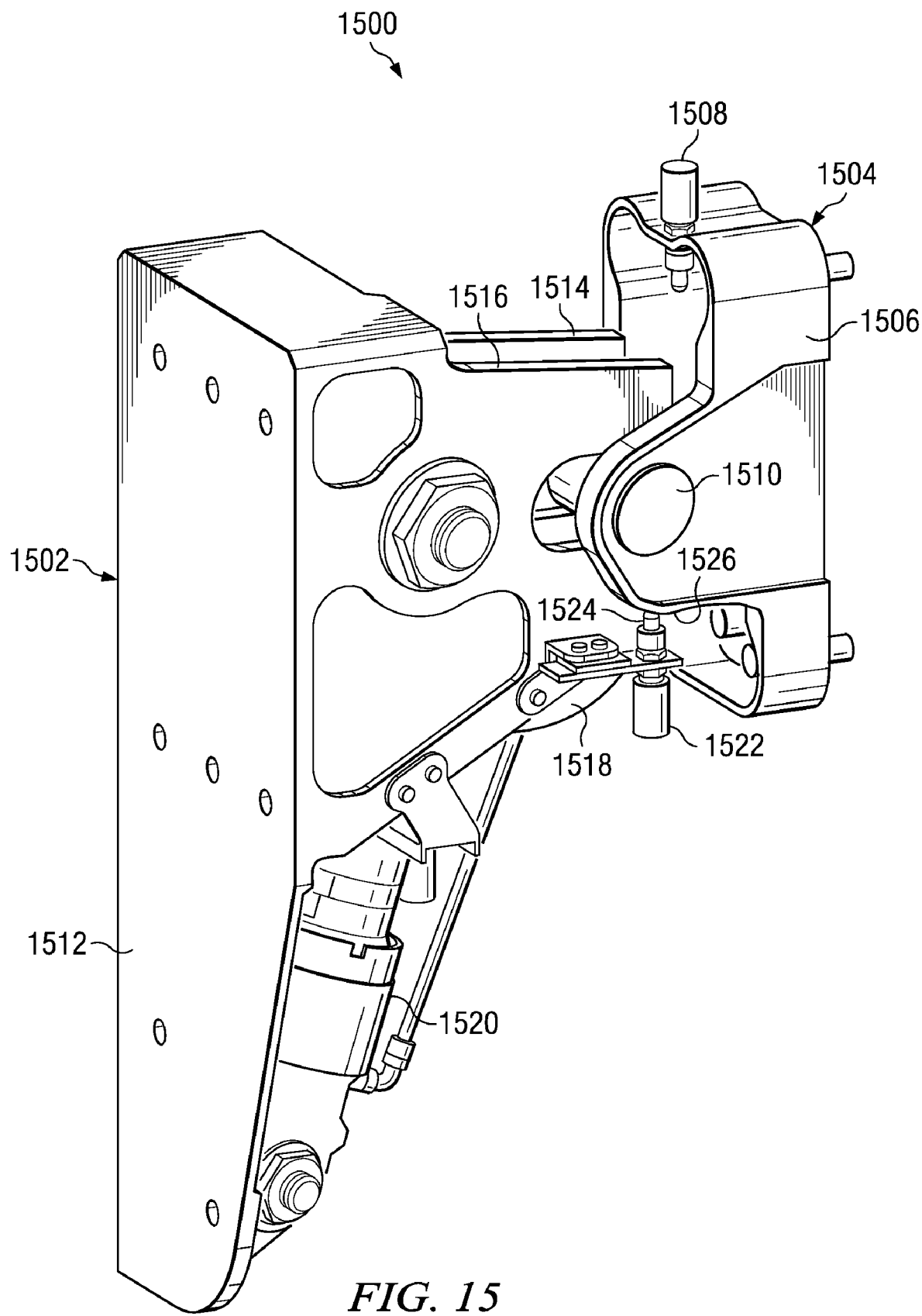
FIG. 15 is an illustration of a pull-in hook mechanism in accordance with an advantageous embodiment.

Turning now to FIG. 15, an illustration of a pull-in hook mechanism is depicted in accordance with an advantageous embodiment. In the depicted illustration, pull-in hook mechanism 1500 is shown in a position when swing tail cargo door 416 is about 0.3 degrees from being closed. In this example, pull-in hook mechanism 1500 may include pull-in hook 1502 and receiver fitting 1504. Pull-in hook 1502 may be an example of pull-in hook 720 or pull-in hook 722 in FIG. 7. Receiver fitting 1504 may be an example of receiver fitting 724 or receiver fitting 726 in FIG. 7.

In this example, receiver fitting 1504 may include receiver pin assembly 1506, swing tail close signal control switch 1508, and receiver pin 1510. Pull-in hook 1502, in this example, may include pull-in hook mechanism assembly 1512, vertical alignment track 1514, vertical alignment track 1516, hook 1518, hydraulic actuator 1520, and in-range signal switch 1522. In this position, pull-in hook 1502 is ready to engage receiver fitting 1504.

In-range signal switch 1522 may be used to indicate when swing tail cargo door 416 has closed to the point such that pull-in hook 1502 may engage receiver fitting 1504. This indication may be displayed using indicator 612 in panel 600 in FIG. 6. In-range signal switch 1522 is actuated when tip 1524 engages surface 1526 on receiver pin assembly 1506 sufficiently to actuate in-range signal switch 1522. In a similar fashion, when pull-in hook 1502 has engaged receiver fitting 1504 sufficiently to close, swing tail close signal control switch 1508 may be actuated. Actuation of this switch may cause indicator 614 in panel 600 to be activated.

Although the depicted examples employ pull-in hook mechanism 1500 for another level of alignment, other types of assemblies also may be used. For example, a wedge, a screw, or a cam mechanism also may be used in addition to or in place of pull-in hook mechanism 1500.

Figure 16:
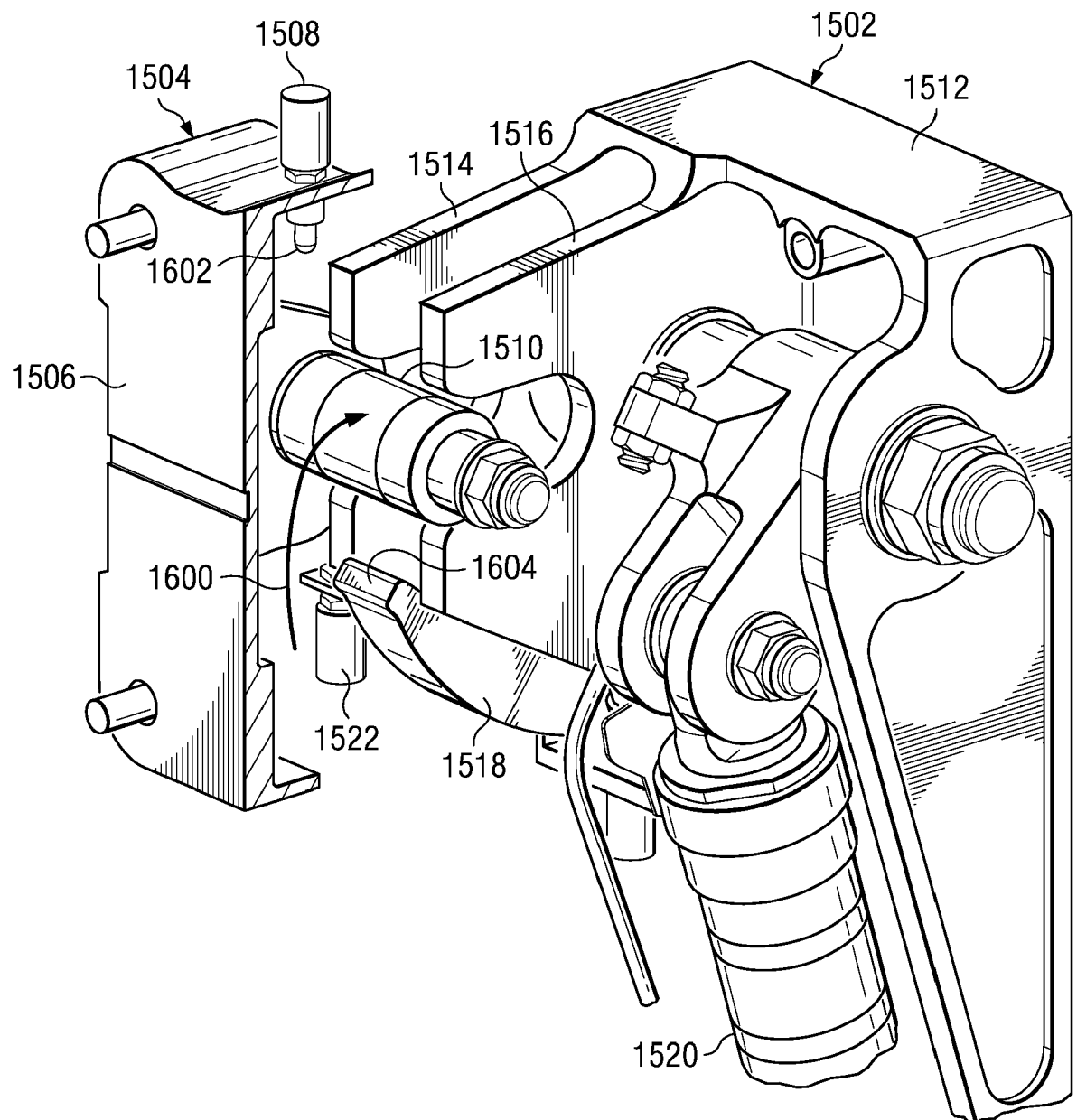
FIG. 16 is an illustration of another view of a pull-in hook mechanism in accordance with an advantageous embodiment.

Turning now to FIG. 16, an illustration of another view of pull-in hook mechanism 1500 is depicted in accordance with an advantageous embodiment. Hydraulic actuator 1520 may cause pull-in hook 1518 to move upwards and rotate along the direction of arrow 1600 to engage receiver pin 1510 to pull in and further provide fine alignment of swing tail cargo door 416. When pull-in hook mechanism 1500 is in a closed stage, tip 1602 may touch surface 1604 on hook 1518 such that swing tail closed signal control switch 1508 may be actuated.

Figure 17:
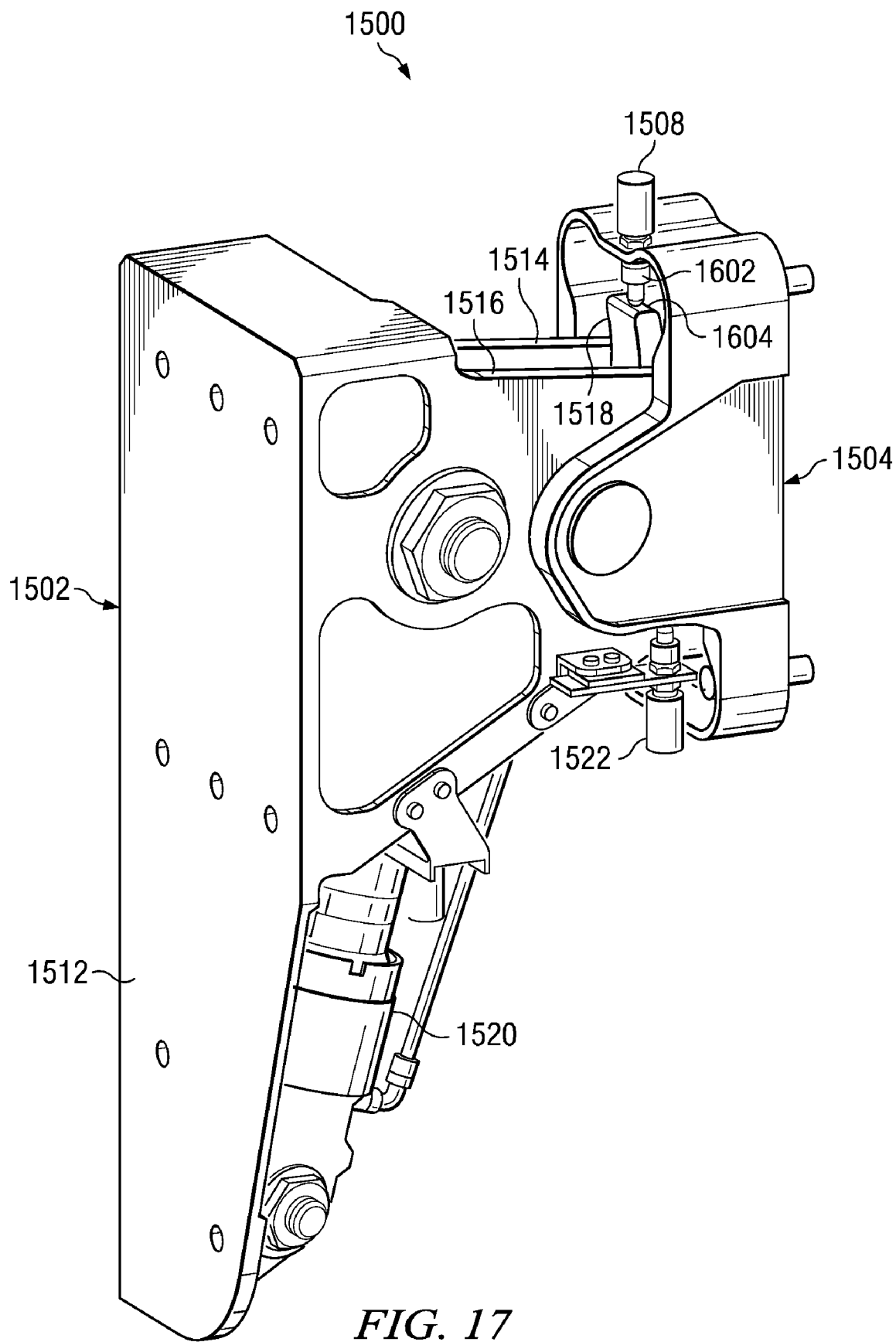
FIG. 17 is an illustration of a pull-in hook mechanism in a closed position in accordance with an advantageous embodiment.

Turning now to FIG. 17, an illustration of a pull-in hook mechanism in a closed position is depicted in accordance with an advantageous embodiment. In this example, pull-in hook mechanism 1500 is in a closed position in which hook 1518 has engaged and closed with respect to receiver pin assembly 1506. As can be seen in this example, swing tail close signal control switch 1508 may be actuated with tip 1602 in contact with surface 1604 of hook 1518.

Figure 18:
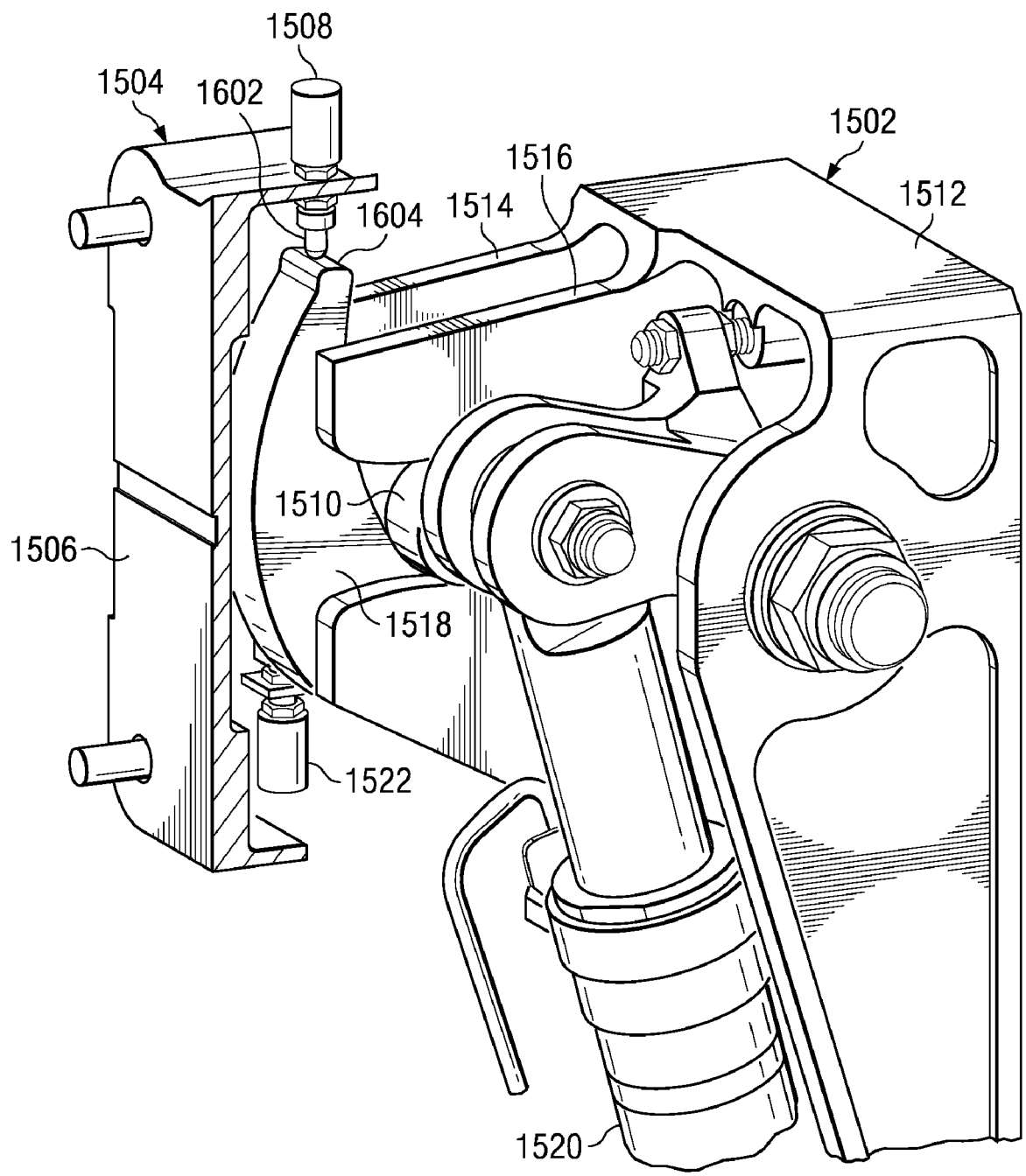
FIG. 18 is an illustration of another view of a pull-in hook mechanism in a closed position in accordance with an advantageous embodiment.

Turning next to FIG. 18, an illustration of another view of a pull-in hook mechanism in a closed position is depicted in accordance with an advantageous embodiment.

Figure 19:
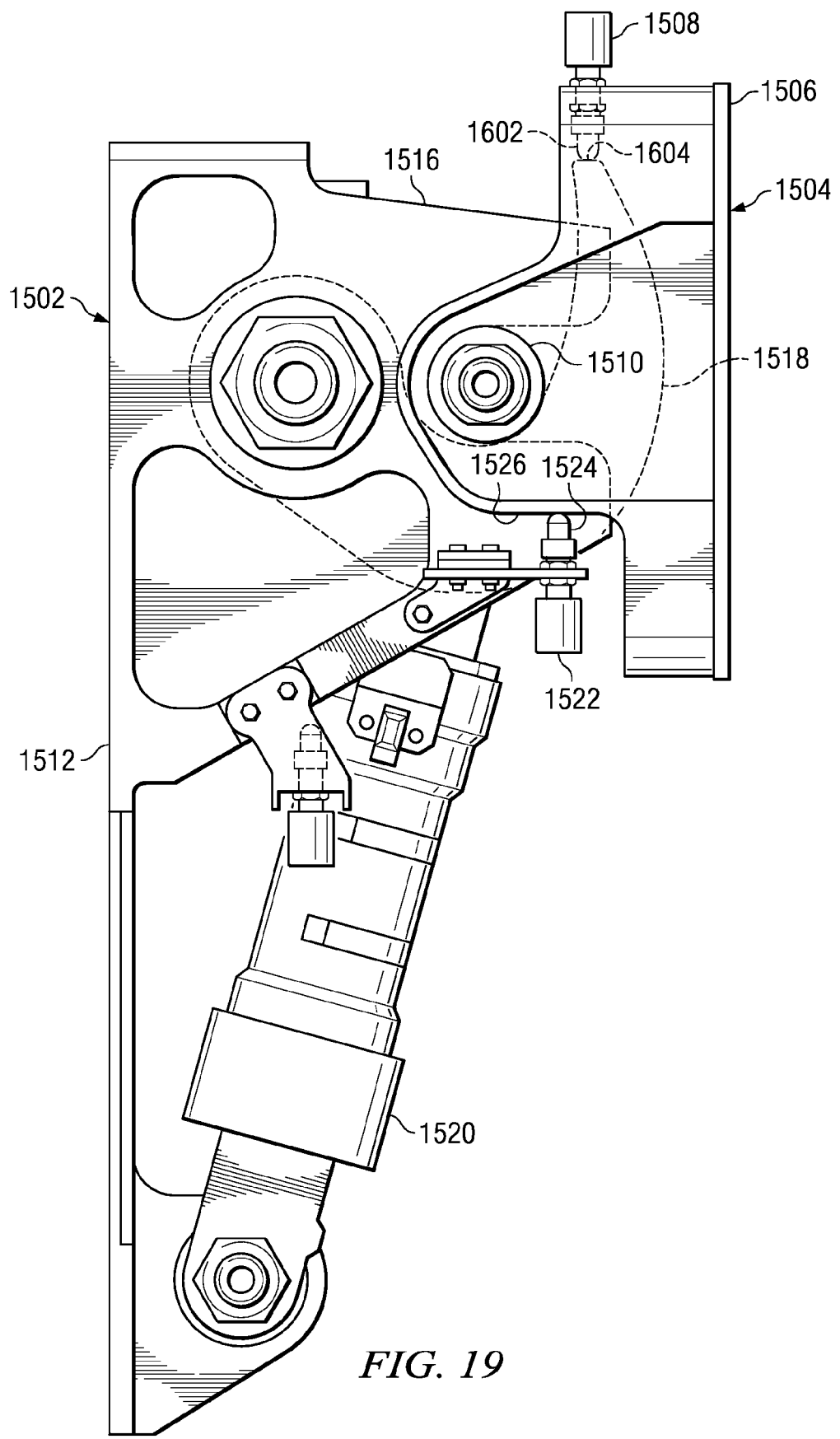
FIG. 19 is an illustration of a side view of a pull-in hook mechanism in accordance with an advantageous embodiment.

With reference now to FIG. 19, an illustration of a side view of a pull-in hook mechanism is depicted in accordance with an advantageous embodiment. In this view of pull-in hook mechanism 1500, the contacts between surfaces and tips of switches may be more clearly seen. In this closed position, tip 1602 is shown in contact with surface 1604 of hook 1518. Further, tip 1602 of in-range signal switch 1522 is shown in contact with surface 1526 of receiver pin assembly 1504.

Figure 20:
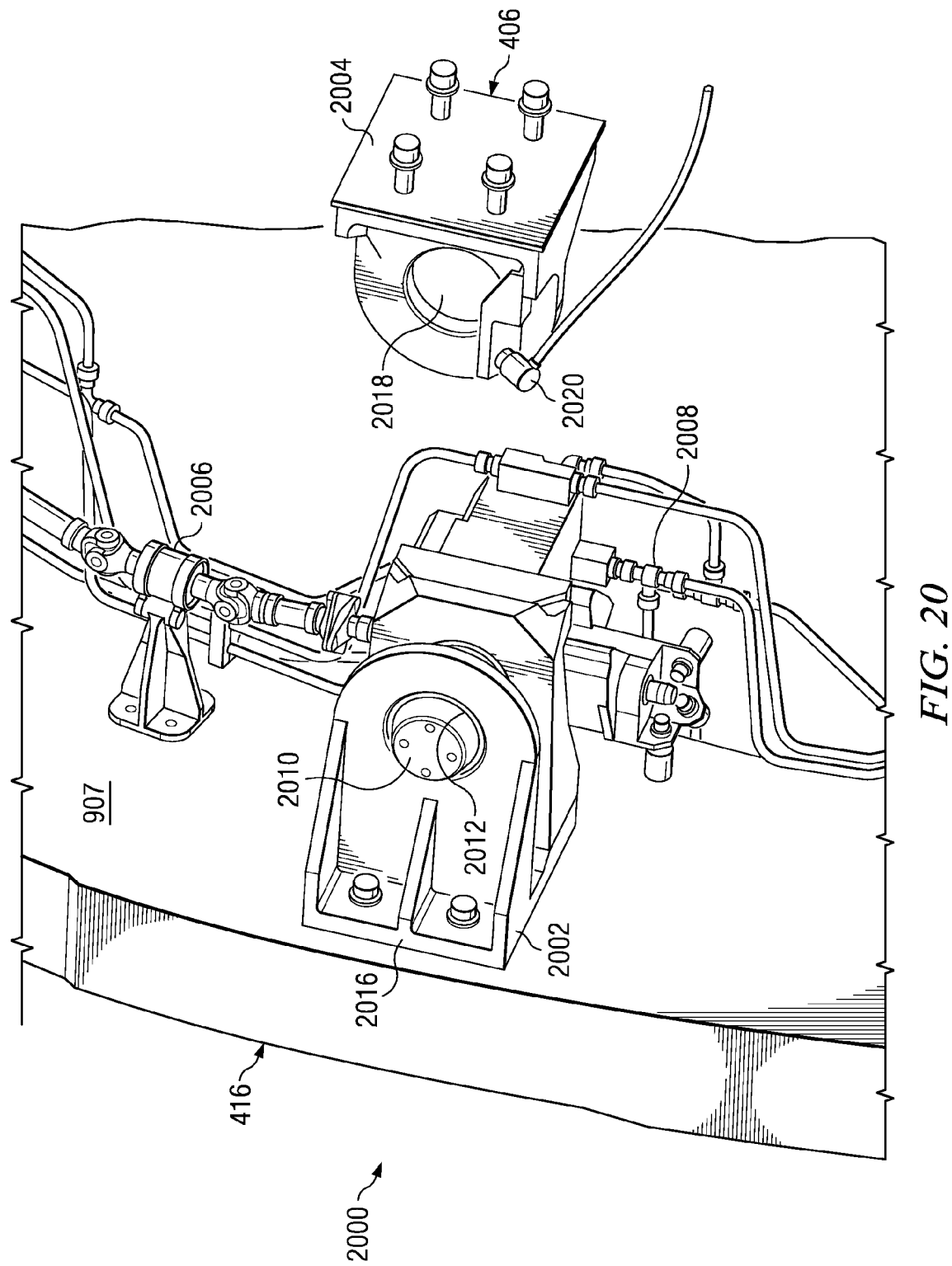
FIG. 20 is an illustration of a latch mechanism in accordance with an advantageous embodiment.

With reference now to FIG. 20, an illustration of a latch mechanism is depicted in accordance with an advantageous embodiment. In this example, latch mechanism 2000 may include latch clevis 2002 and latch lug 2004. Latch lug 2004 may be connected to a surface, such as surface 809 of fuselage 406 in FIG. 8. Latch clevis 2002 may be attached to surface 809 of swing tail cargo door 416 in FIG. 8.

In this example, latch pin actuator lock mechanism 2008 may be controlled by lock train 2006, which may be a lock train, such as upper lock train 954 in FIG. 9. Lock train 2006 controls latch pin actuator lock mechanism 2008, which may be used to lock pin 2010 in the latched position. In this example, pin 2010 may be in a latched position when pin 2010 extends through hole 2012 in latch clevis 2002 and hole 2018 in latch lug 2004. Pin 2010 may be moved into a latched position after swing tail 416 is fully aligned by the alignment feature and fully pulled in by the pull-in system.

Latch lug 2004 includes hole 2018 which may be configured to allow pin 2010 to pass through hole 2018 when swing tail cargo door 416 is in a closed position and ready to be latched. Further, latch lug 2004 also may include switch 2020 which may be used to indicate when latch mechanism 2000 has been latched and locked. Actuation of all of these switches and switches at the ends of each lock train may cause closed latch lock indicator 614 in panel 600 to be lit.

Figure 21:
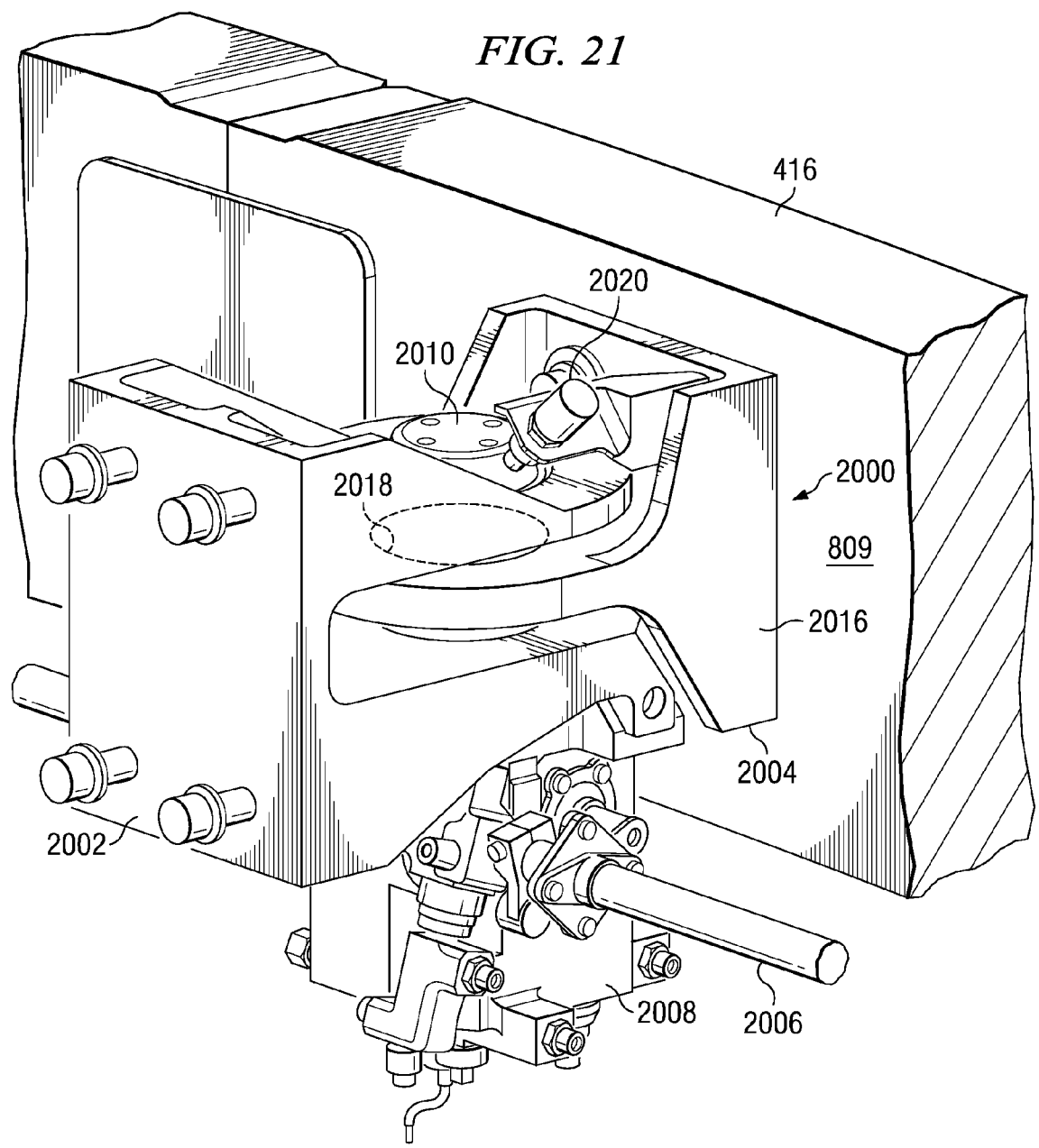
FIG. 21 is a diagram of an engaged latching mechanism in accordance with an advantageous embodiment.

With reference next to FIG. 21, a diagram of an engaged latching mechanism is depicted in accordance with an advantageous embodiment. In this example, latching mechanism 2000 is shown in a latched position after swing tail cargo door 416 has been closed and may be ready to be locked. In this example, fuselage 406 is not shown to better illustrate a closed, latched, and locked position of latching mechanism 2000. In these examples, the latching mechanism may take other forms other than the ones illustrated in the figures. For example, the latches may be, for example, without limitation, hooks, cams, bayonet type connectors, or drift pins.

Figure 22:
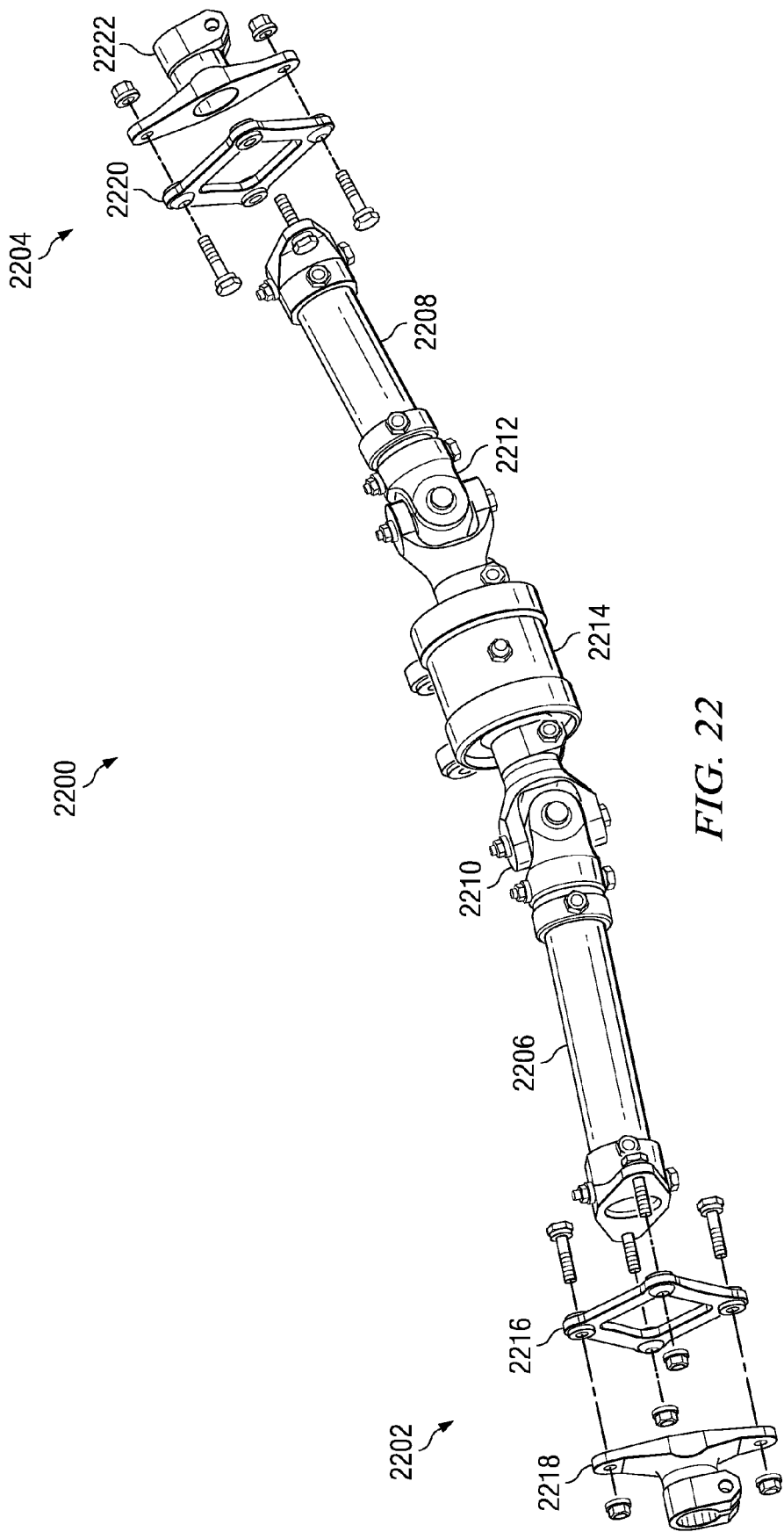
FIG. 22 is an illustration of a lock train in accordance with an advantageous embodiment.

With reference now to FIG. 22, an illustration of a lock train is depicted in accordance with an advantageous embodiment. In this example, lock train assembly 2200 may be an example of a lock train assembly that may be used to implement a lock train, such as upper lock train 954 in FIG. 9. Lock train assembly 2200 may be used in the lock train system to lock or maintain the latch mechanisms in the closed position.

As depicted, lock train assembly 2200 may include flexible coupling assembly 2202 and flexible coupling assembly 2204, which may be connected to torque tube 2206 and torque tube 2208, respectively. Torque tube 2206 may be connected to universal joint 2210, while torque tube 2208 may be connected to universal joint 2212. In turn, these universal joints may be connected to bearing housing 2214.

Flexible coupling assembly 2202 may include coupling plate assembly 2216 and splined connection 2218. Coupling plate assembly 2216 may provide a connection to torque tube 2206. Splined connection 2218 may be connected to coupling plate assembly 2216. Further, splined connection 2218 also may provide a connection to an actuator lock mechanism, such as latch pin actuator lock mechanism 1208 in FIG. 20. In a similar fashion, flexible coupling assembly 2204 includes coupling plate assembly 2220 and splined connection 2222. Latch actuator lock mechanisms are synchronized by means of a lock train system. In order to lock or unlock the drive pins simultaneously of the locking units, the torque tube drive systems may link the lock mechanisms of multiple latches in a manner to minimize backlash. Flexible couplings may be utilized to accommodate deflections and assembly tolerances between the lock mechanisms. The coupling assemblies may also accommodate deflections, misalignments, and positional variations which occur during operation on the ground or in flight, as well as assembly and manufacturing tolerances in the build process.

Thus, the different advantageous embodiments provide a method and apparatus for closing and locking a swing tail cargo door. In one example, an aircraft comprises a fuselage, a pair of wings attached to the fuselage, a swing tail cargo door, and an alignment system. The swing tail cargo door may be moveably attached to the fuselage. The alignment system may be capable of progressively aligning the swing tail cargo door as the swing tail cargo door moves into a closed position. The swing tail cargo door may be moved towards a closed position. The swing tail cargo door may be progressively aligned relative to an aircraft fuselage with a plurality of alignment systems while the swing tail cargo door moves towards the closed position.

The description of the different advantageous embodiments has been presented for purposes of illustration and description, and is not intended to be exhaustive or limited to the embodiments in the form disclosed. Many modifications and variations will be apparent to those of ordinary skill in the art. For example, although the different alignment features show a homogeneous mechanism, a heterogeneous set of features may be used. For example, with one alignment feature, multiple pull-in hook mechanisms are used. Alternatively, a mixture of pull-in hook mechanisms with wedges or screws may be employed, depending on the particular implementation.

Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. An alignment system comprising:
    an alignment ramp configured for initial alignment between a swing tail cargo door and an aircraft fuselage during closing of the swing tail cargo door;
    a set of pull-in hook mechanisms disposed along an interface between the swing tail cargo door and the aircraft fuselage and capable of a final alignment between the swing tail cargo door and the aircraft fuselage during the closing of the swing tail cargo door;
    a set of lock trains disposed along the interface and capable of locking a plurality of latch actuators in a latched position; and
    a set of guide track mechanisms disposed along the interface and capable of intermediate alignment between the swing tail cargo door and the aircraft fuselage during the closing of the swing tail cargo door.

2. The alignment system of claim 1, wherein the alignment ramp provides vertical alignment as part of the initial alignment between the swing tail cargo door and the aircraft fuselage.

3. The alignment system of claim 2 further comprising:
    a set of guide rollers, wherein a surface of the alignment ramp engages the set of guide rollers to cause the vertical alignment between the swing tail cargo door and the aircraft fuselage during the closing of the swing tail cargo door.

4. The alignment system of claim 3, wherein the alignment ramp is located on the aircraft fuselage and the set of guide rollers are located on the swing tail cargo door.

5. The alignment system of claim 1, wherein each pull-in hook mechanism in the set of pull-in hook mechanisms have a receiver pin and a pull-in hook that progressively engages for the final alignment.

6. The alignment system of claim 5, wherein the receiver pin is located on the aircraft fuselage and the pull-in hook is located on the swing tail cargo door.

7. The alignment system of claim 1, wherein each guide track mechanism in the set of guide track mechanisms has a centering roller and a centering guide capable of causing the intermediate alignment when the centering roller engages the centering guide during the closing of the swing tail cargo door.

8. The alignment system of claim 7, wherein the centering roller is located on the aircraft fuselage and the centering guide is located on the swing tail cargo door.

9. The alignment system of claim 1, wherein the plurality of latch actuators is located on the swing tail cargo door and a plurality of latch lugs are located on the aircraft fuselage.

10. The alignment system of claim 1, wherein the swing tail cargo door is closed using mobile swing tail support.

11. The alignment system of claim 1, wherein the swing tail cargo door is moveably attached to the aircraft fuselage by a hinge system.

12. The alignment system of claim 1, wherein the swing tail cargo door is moveable horizontally relative to the aircraft fuselage.

13. An aircraft comprising:
a fuselage;
a pair of wings attached to the fuselage;
a swing tail cargo door moveably attached to the fuselage; and
an alignment system capable of progressively aligning the swing tail cargo door as the swing tail cargo door moves into a closed position, wherein the alignment system comprises a set of guide track mechanisms disposed along an interface and capable of intermediate alignment between the swing tail cargo door and the fuselage, wherein the set of guide track mechanisms comprises a number of centering guide systems.

14. The aircraft of claim 13, wherein the alignment system comprises:
an alignment ramp; and
a set of pull-in hook mechanisms.

15. The aircraft of claim 13 further comprising:
a plurality of latch actuators a plurality of latch lugs; and
a lock train system capable of locking and unlocking the plurality of latch pin actuators in the closed and latched position.

16. The aircraft of claim 13, wherein the alignment system is located along an interface between the swing tail cargo door and the fuselage.

17. A method for closing a swing tail cargo door, the method comprising:
moving the swing tail cargo door towards a closed position; and
aligning the swing tail cargo door relative to an aircraft fuselage progressively with a plurality of alignment systems while the swing tail cargo door moves towards the closed position, wherein the plurality of alignment systems include a set of guide track mechanisms capable of intermediate alignment between the swing tail cargo door and the aircraft fuselage, and wherein the set of guide track mechanisms comprises a number of centering guide systems.

18. The method of claim 17 further comprising:
locking and unlocking latches for the swing tail cargo door in the closed and latched position with a lock train controlling a plurality of lock mechanisms for latch actuators.

19. The method of claim 17, wherein the aligning step comprises:
aligning the swing tail cargo door initially relative to the aircraft fuselage with an alignment ramp.

20. The method of claim 17 further comprising:
aligning the swing tail cargo door finally relative to the aircraft fuselage with a set of pull-in hook mechanisms.

* * * * *